United States Patent
Yetukuri et al.

(10) Patent No.: US 9,457,699 B2
(45) Date of Patent: Oct. 4, 2016

(54) AUTOMATIC HEAD RESTRAINT ADJUSTMENT SYSTEM FOR A VEHICLE SEAT

(75) Inventors: Arjun Yetukuri, Rochester Hills, MI (US); David A. Hein, Sterling Heights, MI (US); Sai Prasad Jammalamadaka, Novi, MI (US)

(73) Assignee: LEAR CORPORATION, Southfield, MI (US)

( * ) Notice: Subject to any disclaimer, the term of this patent is extended or adjusted under 35 U.S.C. 154(b) by 692 days.

(21) Appl. No.: 13/048,985

(22) Filed: Mar. 16, 2011

(65) Prior Publication Data

US 2012/0235459 A1    Sep. 20, 2012

(51) Int. Cl.
*B60N 2/48* (2006.01)
*B60N 2/00* (2006.01)
*B60R 21/015* (2006.01)

(52) U.S. Cl.
CPC .............. *B60N 2/482* (2013.01); *B60N 2/002* (2013.01); *B60N 2/4829* (2013.01); *B60N 2/4855* (2013.01); *B60R 21/01532* (2014.10); *B60R 21/01552* (2014.10)

(58) Field of Classification Search
CPC .... B60N 2/002; B60N 2/482; B60N 2/4855; B60N 2/4829
USPC ................ 701/45, 49; 297/391, 61
See application file for complete search history.

(56) References Cited

U.S. PATENT DOCUMENTS

| | | | |
|---|---|---|---|
| 5,095,257 A | 3/1992 | Ikeda et al. | |
| 5,694,320 A | 12/1997 | Breed | |
| 5,975,637 A * | 11/1999 | Geuss et al. | 297/391 |
| 6,024,378 A | 2/2000 | Fu | |
| 6,088,640 A | 7/2000 | Breed | |
| 6,088,642 A * | 7/2000 | Finkelstein et al. | 701/49 |
| 6,283,504 B1 | 9/2001 | Stanley et al. | |
| 6,402,195 B1 | 6/2002 | Eisenmann et al. | |
| 6,552,550 B2 | 4/2003 | Karray et al. | |
| 6,784,379 B2 | 8/2004 | Breed et al. | |

(Continued)

FOREIGN PATENT DOCUMENTS

| | | |
|---|---|---|
| CN | 1903607 A | 1/2007 |
| CN | 101309814 A | 11/2008 |

(Continued)

OTHER PUBLICATIONS

German Office Action dated Apr. 12, 2013 for corresponding German Application Serial No. 102012203776.4, pp. 1-5.

(Continued)

*Primary Examiner* — Nga X Nguyen
(74) *Attorney, Agent, or Firm* — Brooks Kushman P.C.

(57) ABSTRACT

A seat assembly having an automatically adjustable head restraint is provided. A seat back is mounted within a vehicle and a head restraint assembly is adjustably mounted to the vehicle and disposed adjacent the seat back. The seat back includes a sensor mounted adjacent an upper portion of the seat back for detecting the presence and position of a passenger relative to the head restraint. A controller is in communication with the sensor and receives the output signal of the sensor. The controller then generates a control signal in order to position the head restraint based on the output signals of the sensor. An actuator is connected to the head restraint for positioning the head restraint based on a control signal received from the control module.

20 Claims, 4 Drawing Sheets

(56) References Cited

U.S. PATENT DOCUMENTS

| | | |
|---|---|---|
| 6,805,404 B1 | 10/2004 | Breed |
| 7,066,545 B2 | 6/2006 | Terada et al. |
| 7,145,263 B2 | 12/2006 | Nathan et al. |
| 7,703,847 B2 | 4/2010 | Szablewski |
| 8,201,883 B2 | 6/2012 | Wuerstlein et al. |
| 2002/0000754 A1* | 1/2002 | Saito et al. ............ 307/10.1 |
| 2002/0147535 A1* | 10/2002 | Nikolov ............ 701/45 |
| 2007/0027599 A1 | 2/2007 | Sakai et al. |
| 2010/0222969 A1* | 9/2010 | Yamaguchi ............ 701/49 |
| 2013/0270885 A1 | 10/2013 | Yamaguchi |

FOREIGN PATENT DOCUMENTS

| | | |
|---|---|---|
| CN | 101678784 A | 3/2010 |
| DE | 10250416 A1 | 8/2003 |
| DE | 102005010594 A1 | 9/2006 |
| DE | 10 2005 057 806 A1 | 6/2007 |
| DE | 102008064348 B3 | 4/2010 |
| WO | 2008/107494 A1 | 9/2000 |
| WO | 2008133291 A1 | 11/2008 |
| WO | WO 2009028622 A1 * | 3/2009 |
| WO | 2009/090151 A1 | 7/2009 |

OTHER PUBLICATIONS

Chinese Office Action dated Feb. 28, 2014 in corresponding Chinese Patent Application No. 201210068433.1, pp. 1-10.

Chinese Office Action dated Feb. 28, 2014 for Chinese Patent Application No. 201210068433.1, filed Mar. 15, 2012, 10 pages.

* cited by examiner

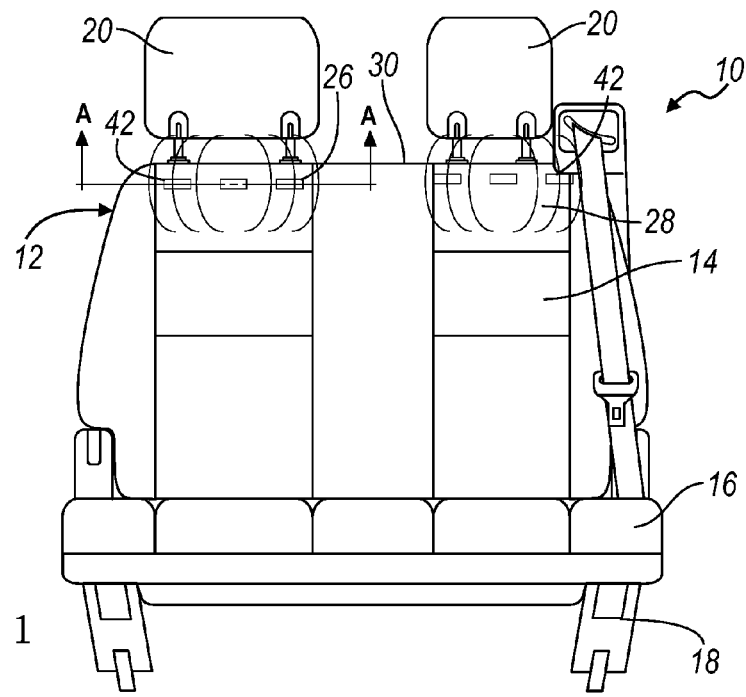
FIG. 1
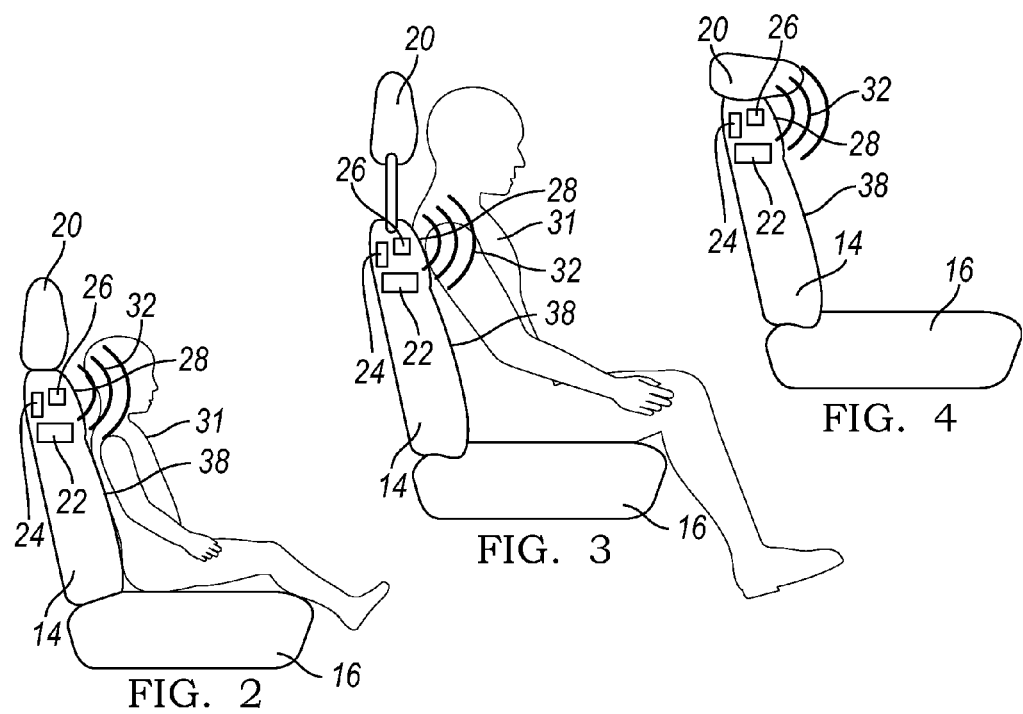
FIG. 2
FIG. 3
FIG. 4

AUTOMATIC HEAD RESTRAINT ADJUSTMENT SYSTEM FOR A VEHICLE SEAT

TECHNICAL FIELD

Various embodiments relate to a system and method for automatically adjusting the head restraint of a vehicle seat.

BACKGROUND

Components of vehicle seat assemblies including the seat cushion, seat back and head restraint are adjustable to a variety of seating positions to support a passenger in a vehicle as well as stowed positions for when the vehicle is used to carry cargo. The head restraint of a vehicle seat typically extends upward from a top portion of the vehicle seat and can be adjusted depending on the size and position of the passenger. When there is no passenger in a vehicle seat, the head restraint may be stowed or folded in order to increase the visibility or so that the seat may be folded for storage. Automatically adjustable head restraints permit adjustment of the head restraint relative to the seat assembly based on the occupancy of the vehicle seat. One such example is disclosed in U.S. Pat. No. 7,145,263 issued to Nathan et al

BRIEF DESCRIPTION OF THE DRAWINGS

FIG. 1 illustrates a seat assembly according to an embodiment of the present invention;

FIG. 2 illustrates a side elevation view of the vehicle seat assembly of FIG. 1 including an automatic head restraint system with the head restraint in an occupied position;

FIG. 3 illustrates another side elevation view of the vehicle seat assembly of FIG. 1 with the head restraint in an occupied position;

FIG. 4 illustrates a side elevation view of the vehicle seat assembly of FIG. 1 with the head restraint in an unoccupied position;

DETAILED DESCRIPTION

Figure 5:
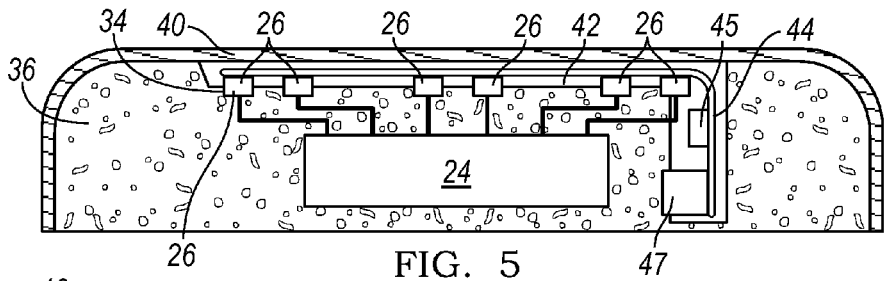
FIG. 5 illustrates a section view of the vehicle seat assembly taken along section A-A of FIG. 1.
Figure 6:
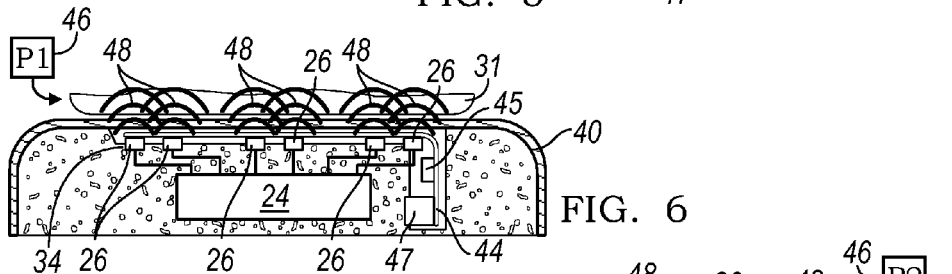
FIG. 6 illustrates another section view of the vehicle seat assembly taken along section A-A of FIG. 1 where the vehicle seat assembly is occupied.

As required, detailed embodiments of the present invention are disclosed herein; however, it is to be understood that the disclosed embodiments are merely various examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to the figures, FIG. 1 shows a vehicle seat assembly 10 having an automatic head restraint control system 12. The vehicle seat assembly 10 is provided in a passenger compartment of a vehicle and may be a front seat of a vehicle or, as shown, may be a bench-type seat for a rear seat.

The vehicle seat assembly 10 includes a seat back 14 and a seat bottom 16. The seat back 14 and seat bottom 16 may be of various constructions but generally include a seat frame (not shown) which is covered by foam cushioning and trim material. The seat back 14 and seat bottom 16 may be mounted and secured to the floor or support frame 18 on the floor of the passenger vehicle. The seat back 14 may be pivotally mounted to the seat bottom 16 to permit the passenger to adjust the seat back 14 relative to the seat bottom 16 or to allow the seat back 14 to be folded in a storage position.

The vehicle seat assembly may also include a head restraint 20. The head restraint may be coupled to the frame of the seat back 14 and may extend generally upright above and adjacent to an upper portion of the seat back 14. At least one head restraint drive mechanism 22 may be operatively connected to the head restraint 20 to actuate and position the head restraint 20 relative to the seat back 14. The head restraint 20 may be retractable so that it may be adjusted in the upright direction by the drive mechanism 22. The head restraint 20 may also be able to tilt or fold in the forward or backward direction by the drive mechanism 22. The drive mechanism 22 may be activated by a control unit 24 in response to data received from at least one sensor 26. A description of the control unit 24 of the automatic head restraint control system 12 will be provided in greater detail below.

Referring to FIGS. 2 through 4, at least one sensor 26 is located in the vehicle seat back 14. The sensor 26 may be embedded in an upper portion 28 of the seat back 14. The upper portion 28 may include at least the upper half of the seat back 14. In another embodiment, the upper portion 28 may include the portion of the seat back adjacent the top surface. The sensors 26 detect if a conductive or capacitive object, such as a passenger, is near the upper portion 28 of the seat back 14. A variety of sensor types may be used in the vehicle seat back 14 to detect the occupancy in the vehicle seat assembly 10. For example, the sensor 26 may include a capacitive-type sensor, disposed in the upper portion 28 of the seat back 14. Additionally, the sensors 26 may be any suitable sensor for detecting the presence of an occupant such as an electromagnetic sensor, ultrasonic sensor, optical sensor or radar sensor disposed adjacent the upper portion 28 of the seat back 14. Alternatively, the sensors 26 may be located along the top surface 30 of the seat back 14. Examples of optical sensors may include infra-red sensors, reflective optical sensors or other suitable optical sensors.

As illustrated in FIG. 2, the sensor 26 may detect the presence or position of a passenger 31 in the vehicle seat assembly 10. The sensor 26 is in communication with the control unit 24. The sensor 26 transmits and receives a signal 32 to determine the presence, size, and/or position of the passenger in the vehicle seat assembly 10. If the passenger 31 is in the vehicle seat assembly 10, the sensor 26 will transmit data relating to the passenger's size and position to the control unit 24. It is contemplated that the control unit 24 may be incorporated in the seat back 14 as illustrated or any suitable position adjacent the vehicle seat assembly 10.

The control unit 24 is coupled to the drive mechanism 22 to automatically adjust the head restraint 20 to a deployed position based on the size and/or location of the passenger. As illustrated in FIG. 2, when the size of the passenger 31 is a small person or a child, the head restraint may be automatically lowered to a lower use-position. As illustrated in FIG. 3, where the passenger 31 is an adult or larger person, the head restraint 20 may be extended upright to a second extended use-position. Finally, as illustrated in FIG. 4 where the sensor 26 does not detect the presence of a passenger, the head restraint may be folded, tilted or lowered to a stowed position.

By locating the sensors 26 along the upper portion 28 of the seat back 14, the head restraint control system 12 is simplified over prior occupant sensing systems. By placing the sensor 26 in the seat back 14 along an upper portion 28, fewer sensors are required to distinguish the size or position of passengers. For example, where a small person or child, such as the passenger 31 depicted in FIG. 2, occupies the seat assembly 10, the sensor 26 located in the upper portion 28 of the seat back 14 can detect the size and position of the passenger even though the passenger's head and shoulders may not extend substantially above the seat back 14 or in front of the head restraint 20. The sensors 26 may also be able to distinguish that the occupant is a passenger as opposed to cargo, such as luggage placed on the seat assembly 10.

Many prior art occupant sensing systems rely on sensing of at least two different characteristics in the seat. Several prior art sensing technology requires complex sensing and multiple sensors placed at locations in the vehicle in the head restraint and seat bottom cushion to distinguish from luggage on the vehicle seat or the size of the passenger. Seat Bottom cushion based occupant sensing systems may create a false alarm when only cargo is placed on a seat and require additional sensing systems to eliminate false indications of an occupant.

Other prior art occupant sensing technology require sensors to detect the sliding adjustment of a seat based on the size or position of the passenger in order to adjust the head restraint. Such prior art systems makes inaccurate assumptions that the seat is moved backward if the occupant is tall, however this may not always be the situation and may result in inaccurate placement of the head restraint. Further, it would not be beneficial for rear seats that are seldom adjustable in a fore-aft direction.

Another prior art complex occupant sensing technology uses seatbelt buckling activated sensors to adjust the head restraint based on the occupancy of a passenger. However, the head restraint adjustment is only activated if the seatbelt is buckled. If rear seat passengers do not buckle the seat belt, the prior art head restraint would not be properly positioned. Further, if the seat is unoccupied, this prior art system may not allow the head restraint to be automatically stowed.

Referring now to FIGS. 5 through 10, a section view through section line A-A of FIG. 1 is illustrated. As illustrated in FIGS. 5 through 10, the head restraint control system 12 may include a plurality of sensors 26 in a sensor assembly 34. The sensor assembly 34 may be arranged in a lateral direction of the seat back 14. The sensor assembly 34 may be embedded in a cushion 36 of the seat back 14. Further, the sensor assembly 34 may be located along a forward facing surface 38 of the seat back 14. As such, the sensor assembly 34 and the foam cushion 36 may be covered along the forward facing surface 38 with a trim material 40 so that the sensor assembly 34 is concealed from view. The trim material 40 may be any suitable material such as cloth or vinyl for covering the cushion 36 and sensor assembly 34.

The sensor assembly 34 may include a plurality of sensors 26 arranged in a conductive pattern 42. As illustrated in FIGS. 5 through 10, the sensor assembly 34 may include a strip of six sensors 26, although any number of sensors 26 may be arranged in a conductive pattern 42. The sensors 26 may be arranged in a conductive pattern 42 where the sensors 26 are equally spaced in the lateral direction in a row along the seat back 14. In an alternate embodiment, as illustrated, the sensors 26 may be arranged in a conductive pattern 42 so that the sensors 26 are grouped in pairs of sensors 26 where each pair of sensors is spaced apart from each other. In a further embodiment, the conductive pattern 42 may include a plurality of rows of sensors 26. However, any suitable conductive pattern 42 is contemplated.

The sensor assembly 34 may also include a flexible circuit 44 on which the sensors 26 are arranged in the conductive pattern 42. The flexible circuit 44 may be a flexible plastic substrate to which the sensors 26 are mounted using adhesive or any suitable means for mounting a sensor to a circuit. The sensor assembly 34, including the sensors 26 and flexible circuit 44, may be mounted to the cushion 36 or trim material 40 with adhesive or any suitable fastening means. Alternatively, the sensor assembly 34 may be molded in the foam cushion 36 or integrally formed in the foam cushion 36 or trim material 40 by any suitable method. The flexible circuit 44 may also be connected to other electrical components 45 in the seat back 14, and may also include a connector 47 which may connect to an electrical wiring harness.

The sensor assembly 34 is operatively connected to the control unit 24. Each sensor 26 is in communication with the control unit 24 and sends output data based on the sensor signal 32 to the control unit 24. The control unit 24 is operatively connected to the drive mechanism 22. The control unit 24 transmits a signal to the head restraint drive mechanism 22 to adjust the position of the head restraint 20 based on the passenger's size and position in order to minimize or prevent injury in case of a vehicle collision. The control unit 24 may communicate with the sensors 26 and the drive mechanism 22 via an input/output interface that may provide various raw data or signal conditioning, processing, filtering, and/or conversion and the like.

FIGS. 6 through 10 illustrate the sensor signal feedback patterns in response to the size and location of the passenger. Based on the sensor signal amplitude 32 of each sensor 26, the control unit 24 may determine the size and position of the passenger 31 based on the signal pattern 46. For example, in FIG. 6, all of the sensors 26 may have a high amplitude sensor signal 48. This signal pattern, indicated as P1, may indicate that the passenger 31, such as an adult, may be tall such that the passenger's broad shoulder region is located along the sensor assembly 34 in the upper portion 28 of the seat back 14.

Figure 7:
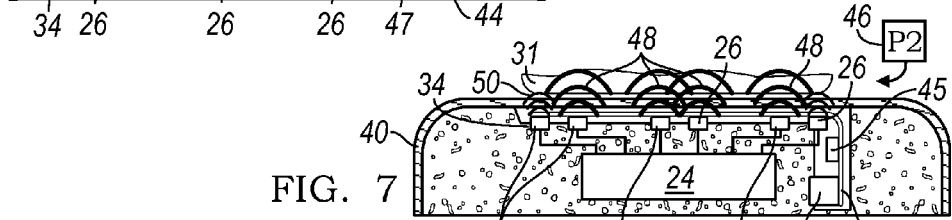
FIG. 7 illustrates another section view of the vehicle seat assembly taken along section A-A of FIG. 1 where the vehicle seat assembly is occupied.

FIG. 7 illustrates a different sensor signal pattern 46. As illustrated in FIG. 7, the two outboard sensors 26 in the lateral direction may have low amplitude signal 50 whereas the center sensors 26 may have high amplitude signal 48. This signal pattern, indicated as P2, may indicate a passenger 31 with narrow shoulders seated in the seat assembly 10 so that the passenger 31 may be an adult, albeit more petite than the passenger 31 indicated by pattern P1.

Figure 8:
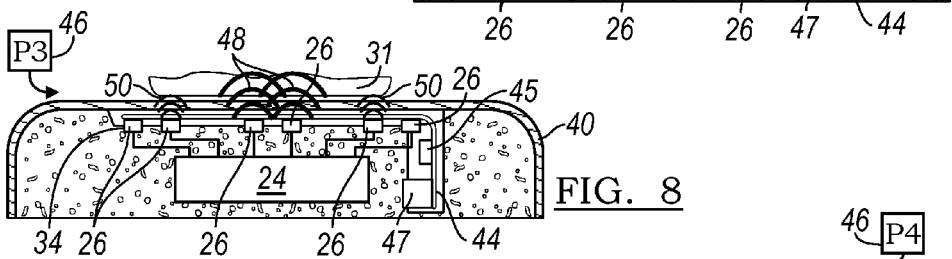
FIG. 8 illustrates another section view of the vehicle seat assembly taken along section A-A of FIG. 1 where the vehicle seat assembly is occupied.

FIG. 8 illustrates a sensor signal pattern 46 where only the center sensors 26 have high amplitude signal 48 and the outboard sensors 26 have no signal. This sensor signal pattern, indicated by P3, may be when the passenger 31 is shorter so that only their head or neck is in front of the sensor assembly 34 along the upper portion 28 of the seat back 14.

Figure 9:
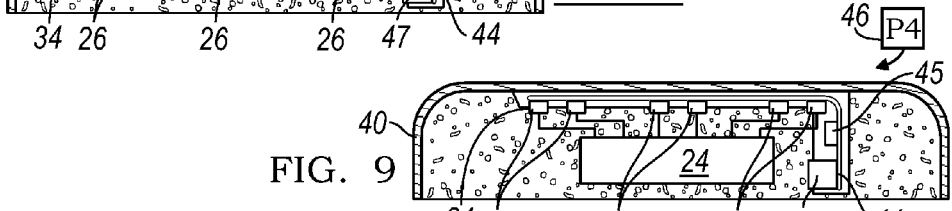
FIG. 9 illustrates another section view of the vehicle seat assembly taken along section A-A of FIG. 1 where the vehicle seat assembly is unoccupied.

FIG. 9 illustrates a sensor signal pattern 46 where none of the sensors 26 show a signal. This sensor signal pattern, indicated as P4, may indicate the seat assembly 10 is empty. Alternatively, the signal pattern P4 may indicate the seat assembly 10 is occupied by cargo or the passenger 31 which may not need a head restraint 20, such as in the instance of a child car seat.

Figure 10:
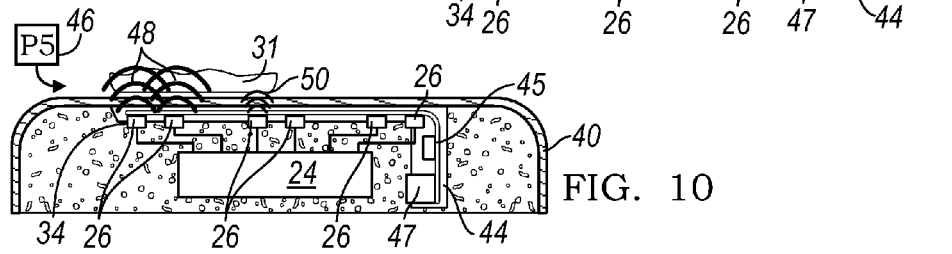
FIG. 10 illustrates another section view of the vehicle seat assembly taken along section A-A of FIG. 1 where the vehicle seat assembly is occupied.

FIG. 10 illustrates a sensor signal pattern 46 which is an asymmetrical signal pattern indicated by P5. The signal pattern P5 discloses a signal pattern 46 where only the sensors 26 along one end of the sensor assembly 34 have a high amplitude signal 48. Sensor signal pattern P5 may show when the passenger 31 is offset from the center of the seat assembly 10, for example if the passenger's head is offset from the center of the seat assembly 10.

While FIGS. 5 through 10 illustrate examples of sensor output signal patterns 46, numerous signal patterns may be possible depending on the size and position of the occupant. A reference table of signal patterns may be used to determine the positions and size ranges of passengers based on a predetermine signal pattern.

Figure 11:
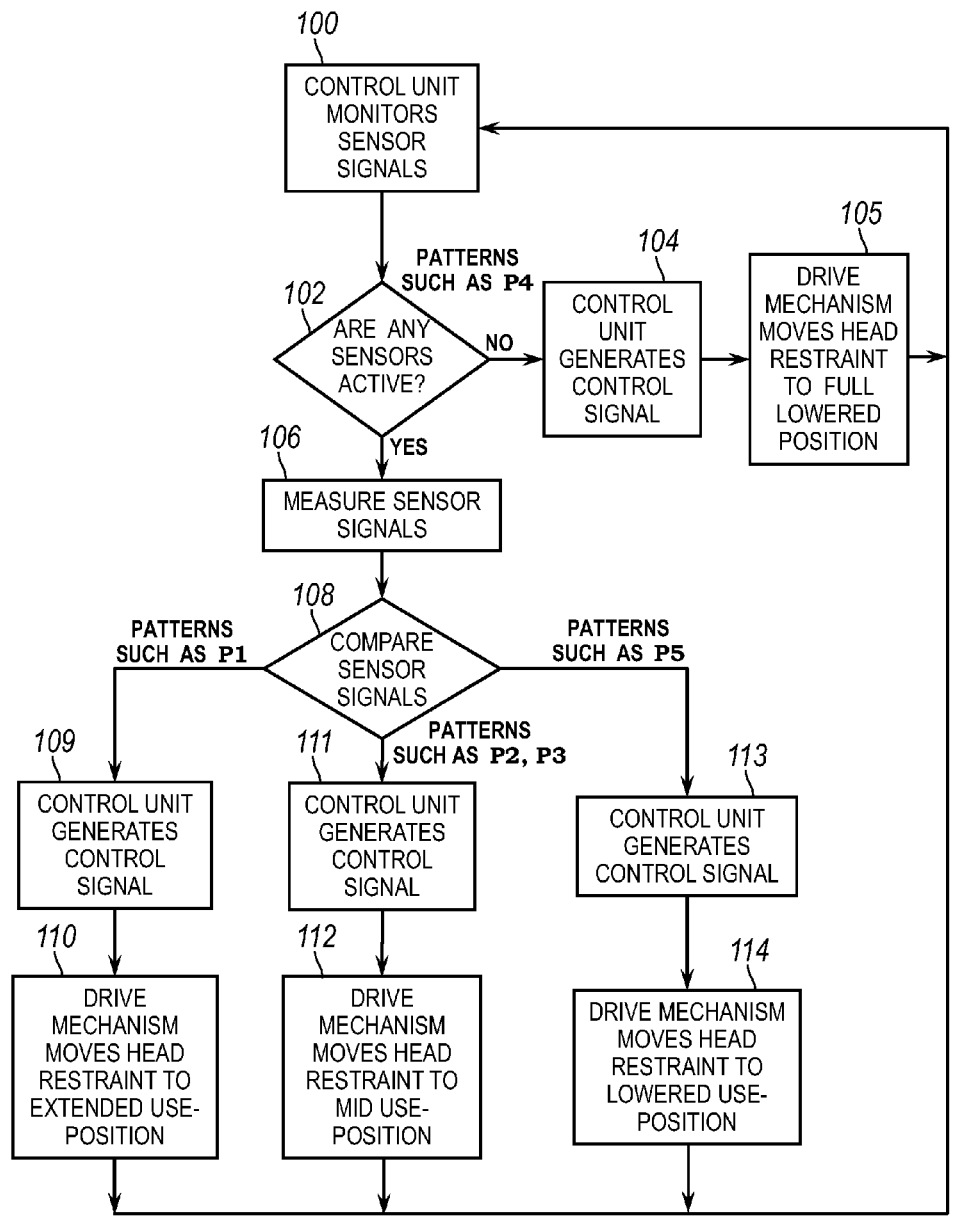
FIG. 11 is a flowchart illustrating a method of automatically adjusting the position of a head restraint of a vehicle seat assembly in accordance with an embodiment.
Figure 12:
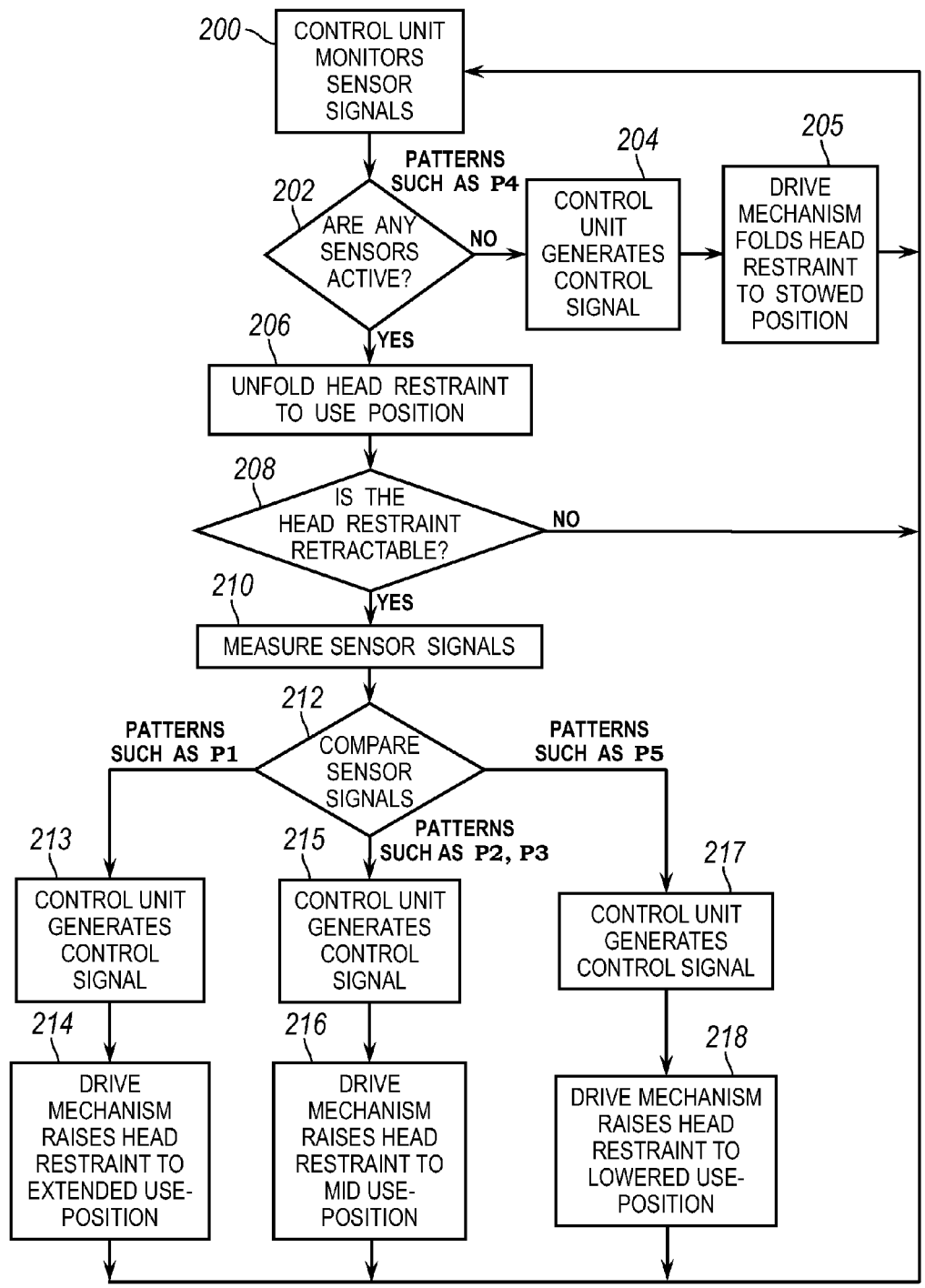
FIG. 12 is a flowchart illustrating a method of automatically adjusting a position of a head restraint of a vehicle seat assembly in accordance with another embodiment.

Referring now to FIG. 11 and FIG. 12, flowcharts illustrate methods of automatically adjusting the position of the head restraint 20 in a front or a rear seat assembly 10. FIGS. 11 and 12 illustrate a simplified flowchart showing the operation of the automatic head restraint control system 12 according to one embodiment of the present invention. As those of ordinary skill in the art will understand, the functions represented by the flowchart blocks may be performed by software and/or hardware. Also, the functions may be performed in an order or sequence other than that illustrated in FIGS. 11 and 12. Similarly, one or more of the steps or functions may be repeatedly performed although not explicitly illustrated. Likewise, one or more of the representative steps of functions illustrated may be omitted in some applications. In one embodiment, the functions illustrated are primarily implemented by software instructions, code, or control logic stored in a computer-readable storage medium and if executed by a microprocessor based computer or controller such as the control unit 24.

FIG. 11 illustrates a seat assembly 10 which may include a retractable head restraint 20. In the first step, the control unit 24 detects sensor signals 32 as represented by block 100. The control unit 24 determines if any sensors 26 are active as represented by block 102. If none of the sensors 26 are active, such as sensor signal pattern P4, the control unit 24 generates a control signal, represented by block 104. Subsequently, the head restraint drive mechanism 22 may move the head restraint 20 to a fully lowered position, as represented by block 105. If any of the sensors 26 are activated, the control unit 24 will measure the sensor signals 32 as represented by block 106.

Next, the control unit 24 may compare the sensor signals 32 to determine a signal pattern 46, as represented by block 108. The control unit 24 may compare the signal amplitude 48, 50 of each of the sensors 26 as well as which sensors 26 are activated. The control unit 24 will determine the signal pattern based on the sensor signal as represented by block 108. The signal pattern 46 may be compared to a series of predetermined signal patterns. The size range or position of the passenger 31 may be determined based on a table of predetermined size ranges and positions, each corresponding to one of the predetermined signal patterns.

Depending on the signal pattern 46, the head restraint drive mechanism 22 may adjust the height of the head restraint 20. If the signal pattern 46 is similar to sensor signal pattern P1, for example, the control unit 24 may generate a control signal, represented by block 109, and the head restraint drive mechanism 22 may move the head restraint 20 to a fully extended use-position, as represented by block 110. Alternatively, if the sensor output signal pattern is a pattern such as signal patterns P2 or P3, the control unit 24 generates a control signal, represented by block 111, and the drive mechanism moves the head restraint 20 to a middle extended use-position as represented by block 112. Likewise, if the sensor signal pattern 46 is a signal pattern such as P5, the control unit 24 generates a control signal, represented by block 113, and the head restraint drive mechanism 22 moves the head restraint 20 to a fully lowered position as represented by block 114. The control unit 24 may continually monitor the sensors 26 to determine the occupancy of the seat assembly 10.

FIG. 12 illustrates a method of adjusting the position of the head restraint according to another embodiment. FIG. 12 is a block diagram illustrating the automatic head restraint control system where the head restraint includes a folding or tilting head restraint. A seat assembly 10 with a folding head restraint 20 having an automatic head restraint control system 12 may be particularly useful in a rear seat. In a rear seat, the head restraint 20 may move automatically to a stowed position, enabling improved rear visibility for a driver in a front seat, for example.

In the first step, the control unit 24 detects sensor signals 32 as represented by block 200. The control unit 24 determines if any sensors 26 are active as represented by block 202. If none of the sensors 26 are active, such as sensor signal pattern P4, the control unit 24 generates a control signal, represented by block 204. Subsequently, the head restraint drive mechanism 22 may fold the head restraint 20 to a stowed position, as represented by block 205. If any of the sensors 26 are activated, the head restraint drive mechanism 22 may unfold and deploy the head restraint 20 to a use-position, as represented by block 206. The step 205 of folding, or unfolding 206, may be performed automatically, or manually by a passenger. Where steps 205, 206 are performed manually, a signal, such as an audio signal, may alert the passenger that the head restraint 20 can be unfolded.

The control unit 24 determines if the head restraint 20 is retractable, or not retractable, as represented by decision block 208. If the head restraint 20 is retractable, the control unit 24 measures the sensor signals 32 as represented by block 210. Next, the control unit 24 compares the sensor signals 32 to determine a signal pattern 46, as represented by block 212. The control unit 24 may compare the signal amplitude 48, 50 of each of the sensors 26 as well as which sensors 26 are activated. The control unit 24 determines the signal pattern based on the sensor signals as represented by block 212. The signal pattern 46 may be compared to a series of predetermined signal patterns. The size range or position of the passenger may be determined based on a table of predetermined size ranges and positions, each corresponding to one of the predetermined signal patterns.

Depending on the signal pattern 46, the head restraint drive mechanism 22 adjusts the height of the head restraint 20. If the signal pattern 46 is a sensor signal pattern such as P1, for example, the control unit 24 generates a control signal, represented by block 213, and the head restraint drive mechanism 22 raises the head restraint 20 to a fully extended use-position, as represented by block 214. Alternatively, if the sensor signal pattern 46 is a pattern such as signal patterns P2 or P3, the control unit 24 may generate a control signal, represented by block 215, and the drive mechanism 22 may move the head restraint 20 to a middle height use-position as represented by block 216. Likewise, if the sensor signal pattern 46 is a signal pattern such as P5, the control unit 24 may generate a control signal, represented by block 217, and the head restraint drive mechanism 24 may move the head restraint 20 to a fully lowered position as represented by block 218.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat portion adapted to be adjustably mounted within a vehicle;
   a plurality of sensors mounted along the seat portion and spaced apart from each other in the lateral direction along the seat portion, wherein the sensors measures capacitance at a plurality of points along the seat portion and provide an output signal indicative of a passenger without requiring contact by the passenger with the seat portion;
   a controller in communication with the sensors for receiving the output signal of the sensors and generating a control signal to position the seat portion based on the output signal; and
   an actuator operatively connected to the seat portion for positioning the seat portion based on the control signal received from the controller.

2. The seat assembly according to claim 1 wherein the seat portion comprises a first seat portion and a second seat portion, wherein the plurality of capacitive sensors is disposed on the first seat portion for detecting when a capacitive object is near the first seat portion and the actuator moves the second seat portion based on the control signal received from the sensors.

3. The seat assembly according to claim 2 wherein the controller compares the capacitance measured by each of the sensors to determine a signal pattern based on the relative capacitance thereby determining the size of the passenger.

4. The seat assembly according to claim 1 wherein the plurality of sensors further comprises at least six sensors mounted along a sensor strip.

5. The seat assembly according to claim 2 wherein the first seat portion includes a foam portion with the plurality of sensors embedded in the foam portion; and
   a trim portion covering the foam portion so that the sensors are concealed from view.

6. The seat assembly according to claim 1 wherein the sensors are located in a rear seat.

7. The seat assembly according to claim 2 wherein the first seat portion includes a seat back and the sensors are located along a top surface of the seat back,
   and wherein the second seat portion includes a head restraint.

8. The seat assembly according to claim 7 wherein the plurality of sensors measures capacitance at a plurality of points along the seat back to determine a signal pattern.

9. The seat assembly according to claim 2 wherein the controller generates an output signal instructing the actuator to position the second seat portion in a first position if the plurality of sensors are not activated and the controller generates a second output signal instructing the actuator to position the second seat portion in a second position if any of the plurality of sensors are activated.

10. The seat assembly according to claim 1 further comprising a head restraint connected to the seat portion and in communication with the actuator, wherein the controller generates an output signal instructing the actuator to position the head restraint in a use position when at least one sensor is activated.

11. The seat assembly according to claim 10 wherein the controller generates an output signal instructing the actuator to adjust the height of the head restraint based on a signal pattern when the head restraint is in a use position.

12. A controller implemented method for automatically adjusting the position of a vehicle seat, the method comprising:
   providing a plurality of sensors positioned on a first portion of the vehicle seat, wherein each of the plurality of sensors is adapted for providing a sensor signal indicative of an occupant based on a capacitance value that does not require contact by the occupant with the portion of the vehicle seat;
   receiving the plurality of sensor signals provided by the sensors;
   comparing, by the controller, the plurality of sensor signals to determine a signal pattern;
   determining, by the controller, a size range of the occupant based on the signal pattern; and
   positioning a second seat portion of the vehicle seat based upon the signal pattern.

13. The method according to claim 12 wherein the second seat portion includes a head restraint, the method further comprising determining if any of the sensors are activated, and
   if none of the plurality of sensors are activated, moving the head restraint to a stowed position.

14. The method according to claim 12 further comprising a step of comparing the signal pattern to a series of predetermined signal patterns; and
   determining the size range of the occupant based on a table of predetermined size ranges each corresponding to one of the predetermined signal patterns.

15. The method according to claim 12 further comprising a step of measuring the capacitance at a plurality of points adjacent the plurality of sensor along the se the vehicle seat to determine the signal pattern.

16. A controller implemented method for automatically adjusting the position of a vehicle seat, the method comprising:
   providing a plurality of sensors positioned on a first portion of the vehicle seat, wherein each of the plurality of sensors is adapted for providing a sensor signal indicative of an occupant based on a capacitance value that does not require contact with the portion of the vehicle seat occupant;
   determining, by the controller, if any of the sensors are activated based on the sensor signal from each of the plurality of sensors;
   moving a second portion of the vehicle seat to a first position if none of the sensors are activated; and moving the second portion of the vehicle seat to a second position if at least one of the plurality of sensors are activated.

17. The method according to claim 16 wherein the plurality of sensors are provided in a rear seat.

18. The method according to claim 16 wherein the plurality of sensors further comprise capacitance sensors which measure a capacitance amplitude based on the size of an occupant.

19. The method according to claim 16 further comprises a step of measuring capacitance at a plurality of points along the first portion of the vehicle seat to determine a signal pattern and adjusting the second portion based on the signal pattern.

20. The method according to claim 12 wherein the plurality of sensors spaced apart are spaced apart from each other in the lateral direction along the first seat portion.

* * * * *

UNITED STATES PATENT AND TRADEMARK OFFICE
CERTIFICATE OF CORRECTION

PATENT NO. : 9,457,699 B2
APPLICATION NO. : 13/048985
DATED : October 4, 2016
INVENTOR(S) : Arjun Yetukuri et al.

Page 1 of 1

It is certified that error appears in the above-identified patent and that said Letters Patent is hereby corrected as shown below:

In the Claims

Column 7, Line 30, Claim 1:
After "wherein the seat sensors"
Delete "measures" and
Insert -- measure --.

Column 8, Line 52, Claim 15:
After "adjacent the plurality of"
Delete "sensor" and
Insert -- sensors --.

Column 8, Line 52, Claim 15:
After "along"
Delete "the se".

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*